(12) United States Patent
Coté et al.

(10) Patent No.: US 6,890,360 B2
(45) Date of Patent: May 10, 2005

(54) FLUOROCHEMICAL URETHANE COMPOSITION FOR TREATMENT OF FIBROUS SUBSTRATES

(75) Inventors: Linda G. Coté, Woodbury, MN (US); Mitchell T. Johnson, Saint Paul, MN (US); Larry A. Lien, Forest Lake, MN (US); Richard S. Buckanin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 402 days.

(21) Appl. No.: 10/022,118

(22) Filed: Dec. 17, 2001

(65) Prior Publication Data

US 2003/0149218 A1 Aug. 7, 2003

(51) Int. Cl.[7] .................. D06M 15/568; D06M 15/576; C09D 175/08; C09D 175/00; C08L 75/08
(52) U.S. Cl. ...................... 8/115.6; 8/115.64; 8/115.67; 427/387; 427/393.4; 428/375; 428/378; 428/391; 428/423.1; 428/425.1; 524/588; 524/591; 528/27; 528/28; 528/30; 528/38; 528/43; 528/45; 528/49; 528/69; 528/70; 528/76
(58) Field of Search .......................... 8/115.6, 115.64, 8/115.67; 427/387, 393.4; 428/375, 378, 391, 423.1, 425.1; 524/588, 591; 528/27, 28, 30, 38, 43, 45, 49, 69, 70, 76

(56) References Cited

U.S. PATENT DOCUMENTS

| | | | |
|---|---|---|---|
| 2,803,615 A | 8/1957 | Ahlbrecht et al. | |
| 3,068,187 A | 12/1962 | Bolstad et al. | |
| 3,094,547 A | 6/1963 | Heine | |
| 3,102,103 A | 8/1963 | Ahlbrecht et al. | |
| 3,341,497 A | 9/1967 | Sherman et al. | |
| 3,450,562 A | 6/1969 | Hoeschele | |
| 3,574,791 A | 4/1971 | Sherman et al. | |
| 3,755,242 A | 8/1973 | Reich | |
| 3,896,251 A | 7/1975 | Landucci | |
| 3,916,053 A | 10/1975 | Sherman et al. | |
| 3,987,182 A | 10/1976 | Gold | |
| 3,987,227 A | 10/1976 | Schultz et al. | |
| 4,024,178 A | 5/1977 | Landucci | |
| 4,215,205 A | 7/1980 | Landucci | |
| 4,426,466 A | 1/1984 | Schwartz | |
| 4,468,527 A | 8/1984 | Patel | |
| 4,487,964 A | 12/1984 | Watson, Jr. et al. | |
| 4,504,401 A | 3/1985 | Matsuo et al. | |
| 4,529,658 A | 7/1985 | Schwartz et al. | |
| 4,540,497 A | 9/1985 | Chang et al. | |
| 4,566,981 A | 1/1986 | Howells | |
| 4,587,301 A | 5/1986 | Watson, Jr. et al. | |
| 4,606,737 A | 8/1986 | Stern | |
| 4,617,057 A | 10/1986 | Plueddemann | |
| 4,668,406 A | 5/1987 | Chang | |
| 4,668,726 A | 5/1987 | Howells | |
| 4,958,039 A | 9/1990 | Pechhold | |
| 4,977,219 A | 12/1990 | Watson, Jr. | |
| 5,025,052 A | 6/1991 | Crater et al. | |
| 5,045,624 A | 9/1991 | Falk et al. | |
| 5,132,028 A | 7/1992 | Nagase et al. | |
| 5,216,097 A | 6/1993 | Allewaert et al. | |
| 5,231,126 A | 7/1993 | Shi et al. | |
| 5,276,175 A | 1/1994 | Dams et al. | |
| 5,414,102 A | 5/1995 | Pohmer et al. | |
| 5,424,474 A | 6/1995 | Pohmer et al. | |
| 5,451,622 A | 9/1995 | Boardman et al. | |
| 5,509,939 A | 4/1996 | Kirchner | |
| 5,565,564 A | 10/1996 | Kirchner | |
| 5,663,273 A | 9/1997 | Haniff et al. | |
| 5,672,651 A | 9/1997 | Smith | |
| 5,688,884 A | 11/1997 | Baker et al. | |
| 5,725,789 A | 3/1998 | Huber et al. | |
| 5,817,249 A | 10/1998 | Audenaert et al. | |
| 6,037,429 A | 3/2000 | Linert et al. | |
| 6,093,775 A | 7/2000 | Pechhold | |
| 6,239,247 B1 * | 5/2001 | Allewaert et al. | ............ 528/49 |
| 6,313,335 B1 * | 11/2001 | Roberts et al. | ............ 556/419 |
| 6,646,088 B2 * | 11/2003 | Fan et al. | ...................... 528/30 |

FOREIGN PATENT DOCUMENTS

| | | |
|---|---|---|
| EP | 0 303 876 A1 | 2/1989 |
| FR | 2 749 309 A1 | 12/1997 |
| WO | WO 93/22282 | 11/1993 |
| WO | WO 97/44375 A1 | 11/1997 |
| WO | WO 02/14443 A2 | 2/2002 |

OTHER PUBLICATIONS

Ed Banks, Organofluorine Chemicals and Their Industrial Applications, pp. 226–234, (1979), Ellis Horwood Ltd.

Douglas A. Wicks and Zeno W. Wicks Jr., "Blocked Isocyanates III.: Part. A. Mechanisms And Chemistry", Progress In Organic Coatings, (Jul. 1999), pp. 148–172, vol. 36, No. 3.

Hans A. Ehlert, Harro Träubel, Bayer AG, Leverkusen, Germany, "New Textile Finishes Based on Blocked and Free Oligomeric Isocyanates", pp. 242–253, date unknown.

* cited by examiner

Primary Examiner—Rabon Sergent
(74) Attorney, Agent, or Firm—Kent S. Kokko

(57) ABSTRACT

Fluorochemical urethane compositions comprising one or more fluorochemical urethane compounds, and one or more auxiliary compounds for treatment of a fibrous substrate are described. The fluorochemical compositions are capable of improving one or more of the oil- and/or water repellency, stain- and/or soil repellency and stain and/or soil release properties, with improved durability, of the fibrous substrate treated with the fluorochemical composition.

24 Claims, No Drawings

FLUOROCHEMICAL URETHANE COMPOSITION FOR TREATMENT OF FIBROUS SUBSTRATES

FIELD OF THE INVENTION

This invention relates to chemical compositions comprising one or more fluorochemical urethane compounds, and one or more auxiliary compounds for treatment of a fibrous substrate. The invention further relates of fluorochemical coating compositions comprising at least one solvent and the chemical compositions of the present invention. The fluorochemical compositions are capable of improving one or more of the oil- and/or water repellency, stain- and/or soil repellency and stain and/or soil release properties, with improved durability, to the fibrous substrate treated with the fluorochemical composition. This invention also relates to articles comprising a fibrous substrate and on this substrate is a cured coating derived from the coating compositions of the present invention. The cured coating resists being worn-off due to wear, abrasion and cleaning. In another aspect, this invention relates to a process for imparting stain-release characteristics to substrates.

BACKGROUND OF THE INVENTION

The use of certain fluorochemical compositions on fibers and fibrous substrates, such as textiles, paper, and leather, to impart oil- and water-repellency and soil- and stain-resistance is well known in the art. See, for example, Banks, Ed., Organofluorine Chemicals and Their Industrial Applications, Ellis Horwood Ltd., Chichester, England, 1979, pp. 226–234. Such fluorochemical compositions include, for example, fluorochemical guanidines (U.S. Pat. No. 4,540,497, Chang et al.), compositions of cationic and non-cationic fluorochemicals (U.S. Pat. No. 4,566,981, Howells), compositions containing fluorochemical carboxylic acid and epoxidic cationic resin (U.S. Pat. No. 4,426,466, Schwartz), fluoroaliphatic carbodiimides (U.S. Pat. No. 4,215,205, Landucci), fluoroaliphatic alcohols (U.S. Pat. No. 4,468,527, Patel), fluorine-containing addition polymers, copolymers, and macromers (U.S. Pat. Nos. 2,803,615; 3,068,187; 3,102,103; 3,341,497; 3,574,791; 3,916,053; 4,529,658; 5,216,097; 5,276,175; 5,725,789; 6,037,429), fluorine-containing phosphate esters (U.S. Pat. Nos. 3,094,547; 5,414,102; 5,424,474), fluorine-containing urethanes (U.S. Pat. Nos. 3,987,182; 3,987,227; 4,504,401; 4,958,039), fluorochemical allophanates (U.S. Pat. No. 4,606,737) fluorochemical biurets (U.S. Pat. No. 4,668,406), fluorochemical oxazolidinones (U.S. Pat. No. 5,025,052), and fluorochemical piperazines (U.S. Pat. No. 5,451,622).

As indicated above, both solvent and water based fluorochemical compositions have been used to provide water- and oil-repellency to fibrous surfaces. Since organic solvents pose health, safety, and environmental concerns, the water-based compositions are particularly desirable. However, the previously known compositions are typically aqueous dispersions or emulsions, not solutions; therefore, may require a high temperature cure to impart good repellency properties. In many cases, for example, high temperature curing is not practical or possible. For this reason there is a continuing need for urethanes that do not require costly and energy consuming high temperature cure conditions to impart good repellency properties. Therefore, urethane compositions, including those containing fluorine, that display increased water solubility are needed to eliminate the need for high temperature cure conditions, as well as to increase the ease of preparation and to provide more stable aqueous solutions.

SUMMARY OF THE INVENTION

The inventors recognized the need for fluorochemical compositions that can successfully impart one or more of the following uniform, durable properties: oil- and water-repellency and/or soil- and stain-resistance and/or soil- and stain-repellency. These chemical compositions may be water and/or organic solvent soluble and may not require high temperatures for curing.

In one aspect, this invention relates to chemical compositions comprising one or more fluorochemical urethane compounds, and one or more auxiliary compounds capable of further improving the soil- and/or stain release and oil- and/or water repellency of a fibrous substrate. These urethane compounds comprise the reaction product of (a) one or more polyfunctional isocyanate compounds; (b) one or more hydrophilic polyoxyalkylene compounds; (c) one or more fluorochemical monofunctional compounds; and (d) one or more isocyanate-reactive silanes.

As used herein, the term "fluorochemical urethane compound" means a compound derived or derivable from the reaction of at least one polyfunctional isocyanate compound and at least one hydrophilic polyoxyalkylene compound, one or more fluorinated monofunctional compounds; and (ii) one or more isocyanate-reactive silane compounds.

The chemical compositions of the present invention, comprising one or more urethane compounds, impart one or more of release, repellency and resistance characteristics to oil, water, stains and soils, and exhibit durability (i.e. they resist being worn-off) when exposed to wear and abrasion from use, cleaning, and the elements. Therefore, these compositions can be applied as coatings to a wide variety of substrates, for example, by topical application, to impart durable release/repellency/resistant properties to the substrates. When applied as a coating, the chemical compositions of the present invention can provide uniform properties to a fibrous substrate and do not change the appearance of the substrate to which they are applied. Even though the urethane compounds are of relatively low fluorochemical content, the chemical compositions of the present invention provide durable stain-release properties comparable to or better than those of the prior art. In addition, with some embodiments, the chemical compositions of the present invention do not require high temperature curing; they can be cured (i.e., dried) at ambient temperature.

Certain preferred embodiments of the chemical compositions of the present invention include those compositions comprising terminal fluorochemical groups having from two to twelve carbons, preferably from three to six carbons, and more preferably four carbons. Even with $R_f$ groups that are relatively short (i.e. six or fewer carbons), these chemical compositions, surprisingly, exhibit excellent release/resistance/repellency. Although compositions comprising lower fluorine content are less expensive, those of skill in the art have typically overlooked $R_f$ groups shorter than eight carbons because they have been known to impart inferior oil- and water-repellency and stain resistance.

Many previously known fluorochemical surfactants contain perfluorooctyl moieties. These surfactants ultimately degrade to perfluorooctyl-containing compounds. It has been reported that certain perfluorooctyl-containing compounds may tend to bio-accumulate in living organisms; this tendency has been cited as a potential concern regarding some fluorochemical compounds. For example, see U.S. Pat. No. 5,688,884 (Baker et al.). As a result, there is a desire for fluorine-containing compositions which are effective in providing desired release/resistance/repellency properties, and which eliminate more effectively from the body (including the tendency of the composition and its degradation products).

It is expected that the preferred fluorochemical compositions of the present invention, which contain perfluoroalkyl $C_3$ to $C_6$ moieties, when exposed to biologic, thermal, oxidative, hydrolytic, and photolytic conditions found in the environment, will break down to various degradation products. For example, compositions comprising perfluorobutylsulfonamido moieties are expected to degrade, at least to some extent, ultimately to perfluorobutylsulfonate salts. It has been surprisingly found that perfluorobutylsulfonate, tested in the form of its potassium salt, eliminates from the body much more effectively than perfluorohexylsulfonate and even more effectively than perfluorooctylsulfonate.

Another embodiment of the present invention relates to a composition for treatment of fibrous substrates comprising a solution of the chemical composition of the present invention and a solvent. In this embodiment, it is important that the chemical composition be dissolved in the solvent. When applied to a substrate, this treatment composition provides a uniform distribution of the chemical composition on the substrate without altering the appearance of the substrate. With some embodiments a high temperature cure is not required to provide this coating; the treatment composition can be cured (i.e. dried) at ambient temperatures. In other embodiments a high temperature cure (e.g. temperatures in above about 125° F. or 49° C.) may be used with coating compositions of the invention.

This invention also relates to an article comprising a fibrous substrate having a cured coating derived from at least one solvent and a chemical composition of the present invention. After application and curing of the chemical composition, the substrate displays durable release/resistance/repellency properties.

This invention further relates to a method for imparting stain-release characteristics to a fibrous substrate, having one or more surfaces, comprising the steps of:

(a) applying the coating composition of the present invention onto one or more surfaces of the substrate and (b) allowing the coating composition to cure (i.e. dry).

DEFINITIONS

Unless otherwise stated, the following terms used in the specification and claims have the meanings given below:

"Acyloxy" means a radical —OC(O)R where R is, alkyl, alkenyl, and cycloalkyl, e.g., acetoxy, 3,3,3-trifluoroacetoxy, propionyloxy, and the like.

"Alkoxy" means a radical —OR where R is an alkyl group as defined below, e.g., methoxy, ethoxy, propoxy, butoxy, and the like.

"Alkyl" means a linear saturated monovalent hydrocarbon radical having from one to about twelve carbon atoms or a branched saturated monovalent hydrocarbon radical having from three to about twelve carbon atoms, e.g., methyl, ethyl, 1-propyl, 2-propyl, pentyl, and the like.

"Alkylene" means a linear saturated divalent hydrocarbon radical having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Aryl aliphatic" means an alkylene radical defined above with an aromatic group attached to the alkylene radical, e.g., benzyl, pyridylmethyl, 1-naphthylethyl, and the like.

"Cured chemical composition" means that the chemical composition is dried or solvent has evaporated from the chemical composition at ambient temperature (15–35° C.) for up to approximately 24 hours or at elevated temperature until dryness.

"Fibrous substrate" means materials comprised of synthetic fibers such as wovens, knits, nonwovens, carpets, and other textiles; and materials comprised of natural fibers such as cotton, paper, and leather.

"Fluorocarbon monofunctional compound" means a compound having one isocyanate-reactive functional group and a perfluoroalkyl or a perfluoroheteralkyl group, e.g. $C_4F_9SO_2N(CH_3)CH_2CH_2OH$, $C_4F_9SO_2N(CH_3)CH_2CH_2NH_2$, $C_4F_9CH_2CH_2OH$, $C_4F_9CH_2CH_2SH$, $C_2F_5O(C_2F_4O)_3CF_2CONHC_2H_4OH$, $C_2F_5O(C_2F_4O)_3CF_2CONHC_2H_4CO_2H$, $C_6F_{13}CH_2OH$, C6F13CH2N(CH_3)OH, and the like.

"Heteroacyloxy" has essentially the meaning given above for acyloxy except that one or more heteroatoms (i.e. oxygen, sulfur, and/or nitrogen) may be present in the R group and the total number of carbon atoms present may be up to 50, e.g., $CH_3CH_2OCH_2CH_2C(O)O-$, $C_4H_9OCH_2CH_2OCH_2CH_2C(O)O-$, $CH_3O(CH_2CH_2O)_nCH_2CH_2C(O)O-$, and the like.

"Heteroalkoxy" has essentially the meaning given above for alkoxy except that one or more heteroatoms (i.e. oxygen, sulfur, and/or nitrogen) may be present in the alkyl chain and the total number of carbon atoms present may be up to 50, e.g. $CH_3CH_2OCH_2CH_2O-$, $C_4H_9OCH_2CH_2OCH_2CH_2O-$, $CH_3O(CH_2CH_2O)_nH$, and the like.

"Heteroalkyl" has essentially the meaning given above for alkyl except that one or more catenary heteroatoms (i.e. oxygen, sulfur, and/or nitrogen) may be present in the alkyl chain, these heteroatoms being separated from each other by at least one carbon, e.g., $CH_3CH_2OCH_2CH_2-$, $CH_3CH_2OCH_2CH_2OCH(CH_3)CH_2-$, $C_4F_9CH_2CH_2SCH_2CH_2-$, and the like.

"Heteroalkylene" has essentially the meaning given above for alkylene except that one or more catenary heteroatoms (i.e. oxygen, sulfur, and/or nitrogen) may be present in the alkylene chain, these heteroatoms being separated from each other by at least one carbon, e.g., $-CH_2OCH_2O-$, $-CH_2CH_2OCH_2CH_2-$, $-CH_2CH_2N(CH_3)CH_2CH_2-$, $-CH_2CH_2SCH_2CH_2-$, and the like.

"Heteroaralkylene" means an aralkylene radical defined above except that catenary oxygen, sulfur, and/or nitrogen atoms may be present, e.g., phenyleneoxymethyl, phenyleneoxyethyl, benzyleneoxymethyl, and the like.

"Halo" means fluoro, chloro, bromo, or iodo, preferably fluoro and chloro.

"Isocyanate-reactive functional group" means a functional group that is capable of reacting with an isocyanate group, such as hydroxyl, amino, thiol, etc.

"Perfluoroalkyl" has essentially the meaning given above for "alkyl" except that all or essentially all of the hydrogen atoms of the alkyl radical are replaced by fluorine atoms and the number of carbon atoms is from 2 to about 12, e.g. perfluoropropyl, perfluorobutyl, perfluorooctyl, and the like.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like "Perfluoroheteroalkyl" has essentially the meaning given above for "heteroalkyl" except that all or essentially all of the hydrogen atoms of the heteroalkyl radical are replaced by fluorine atoms and the number of carbon atoms is from 3 to about 100, e.g. $CF_3CF_2OCF_2CF_2$—, $CF_3CF_2O(CF_2CF_2O)_3CF_2CF_2$—, $C_3F_7O(CF(CF_3)CF_2O)_mCF(CF_3)CF_2$—where m is from about 10 to about 30, and the like.

"Perfluoroheteroalkylene" has essentially the meaning given above for "heteroalkylene" except that all or essentially all of the hydrogen atoms of the heteroalkylene radical are replaced by fluorine atoms, and the number of carbon atoms is from 3 to about 100, e.g., —$CF_2OCF_2$—, —$CF_2O(CF_2O)_n(CF_2CF_2O)_mCF_2$—, and the like.

"Perfluorinated group" means an organic group wherein all or essentially all of the carbon bonded hydrogen atoms are replaced with fluorine atoms, e.g. perfluoroalkyl, perfluoroheteroalkyl, and the like.

"Polyisocyanate compound" means a compound containing two or more isocyanate radicals, —NCO, attached to a multivalent organic group, e.g. hexamethylene diisocyanate, the biuret and iscyanurate of hexamethylene diisocyanate, and the like.

"Reactive polyoxyalkylene" means a polymer having oxyalkylene repeat units with an average of 1 or more isocyanate-reactive functional groups per molecule.

"Silane group" means a group comprising silicon to which at least one hydrolyzable group is bonded, e.g. —$Si(OCH_3)_3$, —$Si(OOCCH_3)_2CH_3$, —$Si(Cl)_3$, and the like.

"Repellency" is a measure of a treated substrate's resistance to wetting by oil and/or water and or adhesion of particulate soil. Repellency may be measured by the test methods described herein.

"Resistance" is the context or soiling or staining is a measure of the treated substrate's ability to avoid staining and/or soiling when contacted by stain or soil respectively.

"Release" is a measure of the treated substrate's ability to have soil and/or stain removed by cleaning or laundering.

"Release/resistance/repellency" means the composition demonstrates at least one of oil repellency, water repellency, stain release, stain repellency, soil release and soil repellency.

DETAILED DESCRIPTION OF THE INVENTION

The chemical compositions of the present invention comprise one or more fluorochemical urethane compounds and one or more auxiliary agents capable of further improving the resistance/release/repellency of a fibrous substrate treated with the fluorochemical urethane compounds. This fluorochemical urethane compound(s) comprises the reaction product of (a) one or more polyfunctional isocyanate compounds; (b) one or more hydrophilic polyoxyalkylene compounds; (c) one or more fluorochemical monofunctional compounds; and (d) one or more silane compounds.

Each fluorochemical urethane compound comprises a urethane group that is derived or derivable from the reaction of at least one polyfunctional isocyanate compound and at least one hydrophilic polyoxyalkylene compound. The fluorochemical urethane compound is terminated, on average, with (i) one or more perfluoroalkyl groups, one or more perfluoroheteroalkyl groups; and (ii) one or more silyl groups. It will be understood that the reaction product will provide a mixture of compounds, some percentage of which will comprise compounds as described, but may further comprise urethane compounds having different substitution patterns and degree of substitution.

In one preferred embodiment, the composition of the present invention comprises 1) a mixture of urethane molecules arising from the reaction of (a) one or more polyfunctional isocyanate compounds, (b) one or more hydrophilic polyoxyalkylene compounds, (c) one or more fluorochemical monofunctional compounds, and (d) one or more silane compounds and 2) one or more auxiliary compounds as described above.

Generally, the amount of said hydrophilic polyoxyalkylene compound is sufficient to react with between 0.1 and 30% of available isocyanate groups, the amount of said silanes is sufficient to react with between 0.1 and 25% of available isocyanate groups, and the amount of said fluorochemical monofunctional compounds is sufficient to react with between 60 and 90% of available isocyanate groups. Preferably, the amount of said hydrophilic polyoxyalkylene (s) is sufficient to react with between 5 and 30% of available isocyanate groups, the amount of said silanes is sufficient to react with between 0.1 and 15% of available isocyanate groups, and the amount of said fluorochemical monofunctional compounds is sufficient to react with between 60 and 90% of available isocyanate groups.

Preferred classes of urethane compounds that may be present are represented by the following formulas:

wherein:

$R_fZR^2$— is a residue of at least one of the fluorochemical monofunctional compounds;

$R_f$ is a perfluoroalkyl group having 2 to about 12 carbon atoms, or a perfluoroheteroalkyl group having 3 to about 50 carbon atoms;

Z is a covalent bond, sulfonamido (—$SO_2NR$—), or carboxamido (—CONR—) where R is hydrogen or alkyl;

$R^1$ is an alkylene, heteroalkylene, aralkylene, or heteroaralkylene group;

$R^2$ is a divalent straight or branched chain alkylene, cycloalkylene, or heteroalkylene group of 1 to 14 carbon atoms, preferably 1 to 8 carbon atoms, more preferably 1 to 4 carbon atoms, and most preferably two carbon atoms, and preferably $R^2$ is alkylene or heteroalkylene of 1 to 14 carbon atoms;

Q is a multi-valent organic group that is a residue of the polyfunctional isocyanate compound;

$R^3$ is a polyvalent, preferably divalent organic group which is a residue of the hydrophilic polyoxyalkylene;

X' is —O—, —S—, or —N(R)—, wherein R is hydrogen or $C_1$–$C_4$ alkyl;

each Y is independently a hydroxy; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

A is selected from the group consisting of $R_fZR^2$—OCONH—, $(Y)_3SiR^1XCONH$—, and $(Y)_3SiR^1NHCOOR^3OCONH$—.

m is an integer from 0 to 2; and n is an integer from 1 to 10.

It will be understood with respect to the above formulas that the compounds represent theoretical structures for the reaction products. The reaction product will contain a mixture of compounds in which the substitution patterns of the isocyanate groups will vary.

Polyfunctional isocyanate compounds useful in the present invention comprise isocyanate groups attached to the multivalent organic group, Q, which can comprise a multivalent aliphatic, alicyclic, or aromatic moiety; or a multivalent aliphatic, alicyclic or aromatic moiety attached to a blocked isocyanate, a biuret, an isocyanurate, or a uretdione, or mixtures thereof. Preferred polyfunctional isocyanate compounds contain at least two and preferably three or more —NCO groups. Compounds containing two —NCO groups are comprised of divalent aliphatic, alicyclic, araliphatic, or aromatic moieties to which the —NCO radicals are attached. Preferred compounds containing three —NCO radicals are comprised of isocyanatoaliphatic, isocyanatoalicyclic, or isocyanatoaromatic, monovalent moieties, which are attached to a biuret or an isocyanurate.

Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more.

The aliphatic polyfunctional isocyanate compounds generally provide better light stability than the aromatic compounds, and are preferred for treatment of fibrous substrates. Aromatic polyfunctional isocyanate compounds, on the other hand, are generally more economical and reactive toward hydrophilic polyoxyalkylene compounds and other isocyanate-reactive compounds than are aliphatic polyfunctional isocyanate compounds.

Suitable aromatic polyfunctional isocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methyoxy-2,4-phenylene diisocyanate, 1-chlorophenyl-2,4-diisocyanate, and mixtures thereof.

Examples of useful alicyclic polyfunctional isocyanate compounds include, but are not limited to, those selected from the group consisting of dicyclohexylmethane diisocyanate ($H_{12}$MDI, commercially available as Desmodur™W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Examples of useful aryl aliphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)-phenyl isocyanate, m-(3-isocyanatobutyl)-phenyl isocyanate, 4-(2-isocyanatocyclohexyl-methyl)-phenyl isocyanate, and mixtures thereof.

Preferred polyisocyanates, in general, include those selected from the group consisting of hexamethylene 1,6-diisocyanate (HDI), 1,12-dodecane diisocyanate isophorone diisocyanate, toluene diisocyanate, dicyclohexylmethane 4,4'-diisocyanate, MDI, derivatives of all the aforementioned, including Desmodur™ N-100, N-3200, N-3300, N-3400, N-3600, and mixtures thereof.

Suitable commercially available polyfunctional isocyanates are exemplified by Desmodur™ N-3200, Desmodur™ N-3300, Desmodur™ N-3400, Desmodur™ N-3600, Desmodur™ H (HDI), Desmodur™ W (bis[4-isocyanatocyclohexyl]methane), Mondur™ M (4,4'-diisocyanatodiphenylmethane), Mondur™ TDS (98% toluene 2,4-diisocyanate), Mondur™ TD-80 (a mixture of 80% 2,4 and 20% 2,6-toluene diisocyanate isomers), and Desmodur™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available as CYTHANE 3160 (American Cyanamid, Stamford, Conn.).

Hydrophilic polyoxyalkylene compounds suitable for use in preparing the first component fluorochemical urethane compounds of the present invention include those polyoxyalkylene compounds that have an average functionality of greater than 1 (preferably, about 2 to 5; more preferably, about 2 to 3; most preferably, about 2, as difunctional compounds such as diols are most preferred). The isocyanate-reactive groups can be primary or secondary, with primary groups being preferred for their greater reactivity. Mixtures of compounds having different functionalities, for examples mixtures of polyoxyalkylene compounds having one, two and three isocyanate-reactive groups, may be used provide the average is greater than 1. The polyoxyalkylene groups include those having 1 to 3 carbon atoms such as polyoxyethylene, polyoxypropylene, and copolymers thereof such as polymers having both oxyethylene and oxypropylene units.

Examples of polyoxyalkylene containing compounds include alkyl ethers of polyglycols such as e.g. methyl or ethyl ether of polyethylene glycol, hydroxy terminated methyl or ethyl ether of a random or block copolymer of ethylene oxide and propylene oxide, amino terminated methyl or ethyl ether of polyethyleneoxide, polyethylene glycol, polypropylene glycol, a hydroxy terminated copolymer (including a block copolymer) of ethylene oxide and propylene oxide, a mono- or diamino-terminated poly (alkylene oxide) such as Jeffamine™ ED, Jeffamine™ EDR-148 and poly(oxyalkylene) thiols. Commercially available aliphatic polyisocyanates include Baygard™ VP SP 23012, Rucoguard™ EPF 1421 and Tubicoat™ Fix ICB.

Useful commercially available hydrophilic polyoxyalkylene compounds for the first component include Carbowax™ poly(ethylene glycol) materials in the number average molecular weight ($M_n$) range of from about 200 to about 2000 (available from Union Carbide Corp.); poly(propylene preferably 1 to 4 carbon atoms, and most preferably two carbon atoms, and X is an isocyanate-reactive functional groups, for example —$NH_2$; —SH; —OH; —N=C=O; or —NRH where R is H or a $C_1$–$C_4$ alkyl.

Representative examples of useful fluorochemical monofunctional compounds include the following:

| | |
|---|---|
| $CF_3(CF_2)_3SO_2N(CH_3)CH_2CH_2OH$, | $CF_3(CF_2)_3SO_2N(CH_3)CH(CH_3)CH_2OH$, |
| $CF_3(CF_2)_3SO_2N(CH_3)CH_2CH(CH_3)NH_2$, | $CF_3(CF_2)_3SO_2N(CH_2CH_3)CH_2CH_2SH$, |
| $CF_3(CF_2)_3SO_2N(CH_3)CH_2CH_2SCH_2CH_2OH$, | $C_6F_{13}SO_2N(CH_3)(CH_2)_4OH$, |
| $CF_3(CF_2)_7SO_2N(H)(CH_2)_3OH$, | $C_3F_7SO_2N(CH_3)CH_2CH_2OH$, |
| $CF_3(CF_2)_4SO_2N(CH_3)(CH_2)_4NH_2$, | $C_4F_9SO_2N(CH_3)(CH_2)_{11}OH$, |
| $CF_3(CF_2)_5SO_2N(CH_2CH_3)CH_2CH_2OH$, | $CF_3(CF_2)_5SO_2N(C_2H_5)(CH_2)_6OH$, |
| $CF_3(CF_2)_2SO_2N(C_2H_5)(CH_2)_4OH$, | $CF_3(CF_2)_3SO_2N(C_3H_7)CH_2OCH_2CH_2CH_2OH$, |
| $CF_3(CF_2)_4SO_2N(CH_2CH_2CH_3)CH_2CH_2OH$, | $CF_3(CF_2)_4SO_2N(CH_2CH_2CH_3)CH_2CH_2NHCH_3$, |
| $CF_3(CF_2)_3SO_2N(C_4H_9)CH_2CH_2NH_2$, | $CF_3(CF_2)_3SO_2N(C_4H_9)(CH_2)_4SH$, |
| $CF_3(CF_2)_3CH_2CH_2OH$ | $C_4F_9OC_2F_4OCF_2CH_2OCH_2CH_2OH$; |
| n-$C_6F_{13}CF(CF_3)CON(H)CH_2CH_2OH$; | $C_6F_{13}CF(CF_3)CO_2C_2H_4CH(CH_3)OH$; |
| $C_3F_7CON(H)CH_2CH_2OH$; | $C_3F_7O(CF(CF_3)CF_2O)_{1-36}CF(CF_3)CH_2OH$; | glycol) materials such as PPG-425 (available from Lyondell Chemicals); block copolymers of poly(ethylene glycol) and poly(propylene glycol) such as Pluronic™ L31 (available from BASF Corporation); the "PeP" series (available from Wyandotte Chemicals Corporation) of polyoxyalkylene tetrols having secondary hydroxyl groups, for example, "PeP" 450, 550, and 650.

Fluorochemical monofunctional compounds suitable for use in preparing the chemical compositions of the present invention include those that comprise at least one $R_f$ group. The $R_f$ groups can contain straight chain, branched chain, or cyclic fluorinated alkylene groups or any combination thereof. The $R_f$ groups can optionally contain one or more heteroatoms (i.e. oxygen, sulfur, and/or nitrogen) in the carbon-carbon chain so as to form a carbon-heteroatom-carbon chain (i.e. a heteroalkylene group). Fully-fluorinated groups are generally preferred, but hydrogen or chlorine atoms can also be present as substituents, provided that no more than one atom of either is present for every two carbon atoms. It is additionally preferred that any $R_f$ group contain at least about 40% fluorine by weight, more preferably at least about 50% fluorine by weight. The terminal portion of the group is generally fully-fluorinated, preferably containing at least three fluorine atoms, e.g., $CF_3O$—, $CF_3CF_2$—, $CF_3CF_2CF_2$—, $(CF_3)_2N$—, $(CF_3)_2CF$—, $SF_5CF_2$—. Perfluorinated aliphatic groups (i.e., those of the formula $C_nF_{2n+1}$—) wherein n is 2 to 12 inclusive are the preferred $R_f$ groups, with n=3 to 5 being more preferred and with n=4 being the most preferred.

Useful fluorochemical monofunctional compounds include compounds of the following formula:

$$R_f\text{-}Z\text{-}R^2\text{—}X$$

wherein:

$R_f$ is a perfluoroalkyl group or a perfluoroheteroalkyl group as defined above;

Z is a connecting group selected from a covalent bond, a sulfonamido group, a carboxamido group, a carboxyl group, or a sulfonyl group; and $R^2$ is a divalent straight or branched chain alkylene, cycloalkylene, or heteroalkylene group of 1 to 14 carbon atoms, preferably 1 to 8 carbon atoms, more and the like, and mixtures thereof. If desired, other isocyanate-reactive functional groups may be used in place of those depicted.

Silane compounds suitable for use in the chemical compositions of the present invention are those of the following formula:

$$X\text{—}R^1\text{—}Si\text{—}(Y)_3$$

wherein X, $R^1$, and Y are as defined previously. Therefore, these silane compounds contain one, two, or three hydrolysable groups (Y) on the silicon and one organic group including an isocyanate-reactive or an active hydrogen reactive radical (X—$R^1$). Any of the conventional hydrolysable groups, such as those selected from the group consisting of alkoxy, acyloxy, heteroalkoxy, heteroacyloxy, halo, oxime, and the like, can be used as the hydrolyzable group (Y). The hydrolysable group (Y) is preferably alkoxy or acyloxy and more preferably alkoxy.

When Y is halo, the hydrogen halide liberated from the halogen-containing silane can cause polymer degradation when cellulose substrates are used. When Y is an oxime group, lower oxime groups of the formula —N=$CR^5R^6$, wherein $R^5$ and $R^6$ are monovalent lower alkyl groups comprising about 1 to about 12 carbon atoms, which can be the same or different, preferably selected from the group consisting of methyl, ethyl, propyl, and butyl, are preferred.

Representative divalent bridging radicals ($R_1$) include, but are not limited to, those selected from the group consisting of —$CH_2CH_2$—, —$CH_2CH_2CH_2$—, —$CH_2CH_2CH_2OCH_2CH_2$—, —$CH_2CH_2C_6H_4CH_2CH_2$—, and —$CH_2CH_2O(C_2H_4O)_2CH_2CH_2N(CH_3)CH_2CH_2CH_2$—.

Other preferred silane compounds are those which contain one or two hydrolyzable groups, such as those having the structures $R^2OSi(R^7)_2R^1XH$ and $(R^8O)_2Si(R^7)R^1XH$, wherein $R^1$ is as previously defined, and $R^7$ and $R^8$ are selected from the group consisting of a phenyl group, an alicyclic group, or a straight or branched aliphatic group having from about 1 to about 12 carbon atoms. Preferably, $R^7$ and $R^8$ are a lower alkyl group comprising 1 to 4 carbon atoms.

Following the hydrolysis of some of these terminal silyl groups, inter-reaction with a substrate surface comprising —SiOH groups or other metal hydroxide groups to form siloxane or metal-oxane linkages, e.g.,

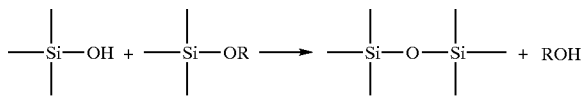

can occur. Bonds thus formed, particularly Si—O—Si bonds, are water resistant and can provide enhanced durability of the stain-release properties imparted by the chemical compositions of the present invention.

Such silane compounds are well known in the art and many are commercially available or are readily prepared. Representative isocyanate-reactive silane compounds include, but are not limited to, those selected from the group consisting of:

anate functional urethane compounds. Aminosilanes are preferred, because of the rapid and complete reaction that occurs between the remaining NCO groups and the silane compound's amino groups. Isocyanato functional silane compounds may be used and are preferred when the ratio of polyfunctional isocyanate compound to the hydrophilic difunctional polyoxyalkylene and fluorochemical monofunctional compound is such that the resulting compound has a terminal hydroxyl group.

These compounds are further functionalized with polyoxyalkylene compounds, having an average functionality of greater than 1, described above by reacting any of the remaining NCO groups in the resulting mixture with one or more of the reactive polyoxyalkylene compounds described above. Thus, the polyoxyalkylene compound(s) is (are)

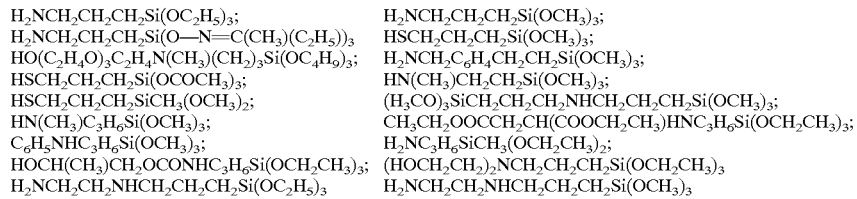

and mixtures thereof.

The chemical compositions of the present invention may be made according to the following step-wise synthesis. As one skilled in the art would understand, the order of the steps is non-limiting and can be modified so as to produce a desired chemical composition. In the synthesis, the polyfunctional isocyanate compound and the monofunctional fluorochemical compound are dissolved together under dry conditions, preferably in a solvent, and then heating the resulting solution at approximately 40 to 80° C., preferably approximately 60 to 70° C., with mixing in the presence of a catalyst for one-half to two hours, preferably one hour. Depending on reaction conditions (e.g., reaction temperature and/or polyfunctional isocyanate used), a catalyst level of up to about 0.5 percent by weight of the polyfunctional isocyanate/polyoxyalkylene mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octanoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis (dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred.

The resulting fluorochemical functional urethane compounds and compounds are then further reacted with one or more of the silane compounds described above. The silane compound is added to the above reaction mixture, and reacts with a substantial portion of the remaining NCO groups. The above temperatures, dry conditions, and mixing are continued one-half to two hours, preferably one hour. Terminal silane-containing groups are thereby bonded to the isocyadded to the reaction mixture, using the same conditions as with the previous additions.

The coating composition of the invention further comprises a second auxiliary compound that is capable of improving the durability of the repellency/resistant/release properties. In particular, the second component improves the stain release in general and the durability of the soil release. The auxiliary compounds are generally non-fluorinated organic compounds and are also called extenders hereinafter. Suitable extenders capable of improving the oil- and/or water repellency properties include for example blocked isocyanates including aromatic and aliphatic blocked isocyanates, aliphatic polyisocyanates and aromatic or aliphatic carbodiimides including aromatic or aliphatic polycarbodiimides. Auxiliary compounds that are capable of enhancing the soil/stain release properties are generally non-fluorinated organic compounds such as for example blocked isocyanate compounds that include a polyoxyalkylene group, in particular a polyoxyethylene group. Auxiliary compounds that are generally capable of improving durability of the repellency properties or soil/stain release properties include non-fluorinated organic compounds that have one or more groups (or a precursor thereof) capable of reacting with the surface of the fibrous substrate. Examples thereof include compounds that have isocyanate groups or blocked isocyanates as described herein.

Polyisocyanates useful in preparing the second component extender include those previously described for the first component. In particularly, the previously described aliphatic isocyanates are preferred due to their better light stability.

The aliphatic polyisocyanate for use in the second component as an extender in the fluorochemical composition is preferably a compound having a molecular weight of at least 350 g/mole. The amount of free isocyanate groups in the aliphatic isocyanate is typically at least 10% by weight of the total weight of the compound, preferably at least 20% by weight. Suitable low molecular weight aliphatic isocyanates include diisocyanates, triisocyanates and mixtures thereof.

Examples include hexamethylenediisocyanate, 2,2,4-trimethyl-1,6-hexamethylenediisocyanate, and 1,2-ethylenediisocyanate, dicyclohexylmethane-4,4'-diisocyanate, aliphatic triisocyanates such as 1,3,6-hexamethylenetriisocyanate, cyclic trimer of hexamethylenediisocyanate and cyclic trimer of isophorone diisocyanate (isocyanurates).

The polyoxyalkylene compound is generally reacted with the aliphatic polyisocyanate in the presence of a catalyst such as an organic tin compound and under reaction conditions commonly employed. Polyoxyalkylene compounds useful in preparing the second component extender include those previously described for the first component. However, the polyoxyalkylene component preferably has a functionality of less than two and is more preferably one. Mixtures of polyoxyalkylene compounds having different degrees of functionality may be used, provided that the average functionality is less than two. Useful functional groups include any group that is reactive toward the isocyanate groups of the second component polyisocyanate, for example —NH$_2$; —SH; —OH; —N=C=O; or —NRH, where R is a lower alkyl. Monofunctional polyoxyalkylene compounds are preferred.

The amount of polyoxyalkylene compound will be selected such as to leave a desired amount of isocyanate groups unreacted. Generally the amount of polyoxyalkylene compound is such that from about 25 to about 75%, preferably 25 to 40% of the available isocyanate groups are reacted. The remaining isocyanate groups may be free isocyanate groups or may be preferably blocked isocyanate groups. The resultant reaction mixture can be used in compositions of the invention.

The polyoxyalkylene groups include those having 1 to 3 carbon atoms such as polyoxyethylene, polyoxypropylene, polyoxytetramethylene and copolymers thereof such as polymers having both oxyethylene and oxypropylene units. The polyoxyalkylene containing organic compound may include one or two functional groups such as hydroxy or amino groups. Examples of polyoxyalkylene containing compounds include alkyl ethers of polyglycols such as e.g. methyl or ethyl ether of polyethyleneglycol, hydroxy terminated methyl or ethyl ether of a random or block copolymer of ethyleneoxide and propyleneoxide, amino terminated methyl or ethyl ether of polyethyleneoxide, polyethylene glycol, polypropylene glycol, a hydroxy terminated copolymer (including a block copolymer) of ethyleneoxide and propylene oxide, a diamino terminated poly(alkylene oxide) such as Jeffamine™ ED, Jeffamine™ EDR-148 and poly (oxyalkylene) thiols. Commercially available aliphatic polyisocyanates include Baygard™ VP SP 23012, Rucoguard™ EPF 1421 and Tubicoat™ Fix ICB.

A "blocked isocyanate" is a polyisocyanate of a portion of the isocyanate groups have been reacted with a blocking agent. Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperature the blocking group will be released from the blocked polyisocyanate group thereby generating the isocyanate group again which can then react with an isocyanate reactive group, such as may be found on the surface of a fibrous substrate. Blocking agents and their mechanisms have been described in detail in "Blocked isocyanates III.: Part. A, Mechanisms and chemistry" by Douglas Wicks and Zeno W. Wicks Jr., Progress in Organic Coatings, 36 (1999), pp. 14–172.

The blocked isocyanate may be aromatic, aliphatic, cyclic or acyclic and is generally a blocked di- or triisocyanate or a mixture thereof and can be obtained by reacting an isocyanate with a blocking agent that has at least one functional group capable of reacting with an isocyanate group. Preferred blocked isocyanates are blocked polyisocyanates that, at a temperature of less than 150° C., are capable of reacting with an isocyanate reactive group, through deblocking of the blocking agent at elevated temperature. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles.

According to a particular embodiment of the invention, the blocked polyisocyanate may comprise the condensation product of a polyisocyanate, for example a di- or triisocyanate, a blocking agent, and an polyoxyalkylene compound, the polyoxyalkylene compound having one or more, preferably one, isocyanate reactive groups such as a hydroxy, amino or thiol group. Examples of such organic compounds include those described above. Particularly preferred are blocked polyisocyanates that have a self-emulsifying capability in water. The use of blocked isocyanate compounds are particularly useful in fibrous substrate when co-applied with permanent press treatments, which require elevated temperatures during application.

Examples of polyisocyanates for preparing the blocked polyisocyanates include di- or triisocyanates as well as mixtures thereof. Specific examples are aromatic diisocyanates such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate and aromatic tri-isocyanates such as polymethylenepolyphenylisocyanate.

Still further isocyanates that can be used for preparing a blocked isocyanate include alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic tri-isocyanates such as polymethylenepolyphenylisocyanate (PAPI); cyclic diisocyanates such as isophorone diisocyanate (IPDI) and dicyclohexylmethane-4,4'-diisocyanate. Also useful are isocyanates containing internal isocyanate-derived moieties such as biuret-containing tri-isocyanates such as that available from Bayer as DESMODUR™ N-100, isocyanurate-containing tri-isocyanates such as that available from Huls AG, Germany, as IPDI-1890, and azetedinedione-containing diisocyanates such as that available from Bayer as DESMODUR™ TT. Also, other di- or tri-isocyanates such as those available from Bayer as DESMODUR™ L and DESMODUR™ W, and tri-(4-isocyanatophenyl)-methane (available from Bayer as DESMODUR™ R) are suitable.

Commercially available blocked aromatic polyisocyanates include Baygard™ EDW available from Bayer Corp. and Hydrophobol™ XAN available from Ciba-Geigy.

A still further class of extenders suitable for use with the fluorochemical composition of this invention are hydrophilic carbodiimides. Suitable carbodiimides have been described in for example U.S. Pat. No. 4,668,726, U.S. Pat. No. 4,215,205, U.S. Pat. No. 4,024,178, U.S. Pat. No. 3,896,251, WO 93/22282, U.S. Pat. No. 5,132,028, U.S. Pat. No. 5,817,249, U.S. Pat. No. 4,977,219, U.S. Pat. No. 4,587,301, U.S. Pat. No. 4,487,964, U.S. Pat. No. 3,755,242 and 3,450,562. Particularly suitable carbodiimides for use in this invention include those corresponding to the formula:

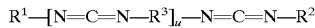

$$R^1-[N=C=N-R^3]_u-N=C=N-R^2$$

wherein u has a value of 1 to 10, typically 1 or 2, $R^1$ and $R^2$ each independently represent a hydrocarbon group, in particular a linear, branched or cyclic aliphatic group preferably having 6 to 18 carbon atoms and $R^3$ represents a divalent linear, branched or cyclic aliphatic group.

Yet a further class of extenders that can be advantageously used as the second component in a fluorochemical urethane treatment composition of this invention include hydrophilic polymers of acrylic and/or methacrylic monomers. Particular examples of such polymers include homo- and copolymers of partial alkyl esters of acrylic and methacrylic acid such as for example $C_1$ to $C_{30}$ alkyl esters of acrylic acid. Such acrylates should have sufficient free (unesterified) carboxyl groups to provide the requisite hydrophilicity. Specific examples of such alkyl esters include methyl acrylate, ethyl acrylate, butyl acrylate, octadecyl acrylate and lauryl acrylate. Specific examples of suitable polymers include a homopolymer of methyl acrylate and a copolymer of methyl acrylate and octadecyl acrylate. One particularly useful product is FC-672™, an acrylate stainblocker available from the 3M Company The ratio of the first component fluorochemical urethane compound(s) to the second component auxiliary compound may be from about 12:1 to 1:12 and is typically from about 3:1 to 6:1.

The treatment composition for fibrous substrates comprises a solution of the chemical compositions of the present invention and at least one solvent. When applied to fibrous substrates, the treatment compositions impart stain-release characteristics and exhibit durability (i.e. they resist being worn-off) when exposed to wear and abrasion from use, cleaning, and the elements.

The chemical compositions of the present invention can be dissolved in a variety of solvents to form coating compositions suitable for use in coating the chemical compositions of the present invention onto a substrate. Fibrous substrate treatment compositions may contain from about 0.1 to about 50 weight percent chemical composition. Preferably the chemical composition is used in the coating composition at about 0.1 to about 10 weight percent, most preferably from about 2 to about 4 weight percent.

Suitable solvents include water, alcohols, esters, glycol ethers, amides, ketones, hydrocarbons, chlorohydrocarbons, chlorocarbons, and mixtures thereof. Depending upon the substrate to which the composition is being applied, water is the preferred solvent because it does not raise any environmental concerns and is accepted as safe and non-toxic.

The treatment compositions of the present invention can be applied as to a wide variety of fibrous substrates resulting in an article that displays durable stain-release properties. The article of the present invention comprises a fibrous substrate having a treatment derived from at least one solvent and a chemical composition of the present invention. After application and curing of the coating composition, the substrate displays durable stain-release properties.

The treatment composition may also be applied to other substrates including glass, ceramic, stone, metal, semi-porous materials such as grout, cement and concrete, wood, paint, plastics, rubber.

The treatment compositions of the present invention can be applied to a wide variety of fibrous substrates including woven, knit, and nonwoven fabrics, textiles, carpets, leather, and paper. Substrates having nucleophilic groups, such as cotton are preferred because they can bond to the silane groups and/or isocyanate groups of the chemical compositions of the present invention, thereby increasing durability of the fiber treatment. Any application method known to one skilled in the art can be used including spraying, dipping, immersion, foaming, atomizing, aerosolizing, misting, flood-coating, and the like.

To impart release/repellency/resistance characteristics to a fibrous substrate, the coating composition of the present invention is applied to the substrate and is allowed to cure (i.e. dry), at ambient or elevated temperature.

In order to affect treatment of the fibrous substrate the fibrous substrate is contacted with the fluorochemical composition of the invention. For example, the substrate can be immersed in the fluorochemical treating composition. The treated substrate can then be run through a padder/roller to remove excess fluorochemical composition and dried or cured. The treated substrate may be dried at room temperature by leaving it in air or may alternatively or additionally be subjected to a heat treatment, for example, in an oven. A heat treatment is typically carried out at temperatures between about 50° C. and about 190° C. depending on the particular system or application method used. In general, a temperature of about 120° C. to 170° C., in particular of about 150° C. to about 170° C. for a period of about 20 seconds to 10 minutes, preferably 3 to 5 minutes, is suitable. Alternatively, the chemical composition can be applied by spraying the composition on the fibrous substrate. An ambient cure preferably takes place at approximately 15 to 35° C. (i.e. ambient temperature) until dryness is achieved, up to approximately 24 hours. With either heat-treatment or ambient cure, the chemical composition can also form chemical bonds with the substrate and between molecules of the chemical composition.

The choice of either heat-treatment or ambient cure often depends on the desired end-use. For consumer applications, where the composition may be applied to household laundry or carpeting, and ambient cure is desired. For industrial applications, where the fibrous substrate, such as a textile might normally be exposed to elevated temperatures during production, an elevated temperature cure or heat-treatment may be desirable. Generally, those composition containing blocked isocyanate groups are preferred where a heat-treatment is encountered The amount of the treating composition applied to the fibrous substrate is chosen so that a sufficiently high level of the desired properties are imparted to the substrate surface without substantially affecting the look and feel of the treated substrate. Such amount is usually such that the resulting amount of the fluorochemical urethane composition on the treated fibrous substrate will be between 0.05% and 5% by weight based on the weight of the fibrous substrate, known as solids on fiber or SOF. The amount that is sufficient to impart desired properties can be determined empirically and can be increased as necessary or desired.

Fibrous substrates that can be treated with the fluorochemical composition include in particular textiles. The fibrous substrate may be based on synthetic fibers, e.g. polyester, polyamide and polyacrylate fibers or natural fibers, e.g. cellulose fibers as well as mixtures thereof. The fibrous substrate may be a woven as well as a non-woven substrate. Preferred substrates are cellulosic materials such as cotton, rayon, TENCEL™ and blends of cellulosic materials.

The resulting treated substrates derived from at least one solvent and a chemical composition of the present invention, have been found to be resist soils and/or stains and/or to release soils and/or stains with simple washing methods. The cured treatments have also been found to be durable and hence to resist being worn-off due to wear and abrasion from use, cleaning, and the elements.

The invention will now be further illustrated with reference to the following examples without the intention to limit the invention thereto. All parts and percentages are by weight unless stated otherwise.

EXAMPLES ounces/yd$^2$ basis wt; available from Cleveland Mills, Lawndale, N.C.).

Application & Testing of Compositions
Application of Compositions to Polyester/Cotton Woven Fabrics A 65% polyester, 35% cotton twill fabric was dipped into a bath of the diluted polymer and immediately sent through a nip. The concentration of the bath is adjusted to produce a fabric that when dry had a fluorochemical solids coating ranging from 0.2 to 0.45% solids of the fabric total weight. The bath also contained a glyoxal-type resin, PERMA-FRESH™ ULF (Omnova Solutions, Inc., Chester, S.C.) at about 10% on the weight of the bath, a citric acid activated magnesium chloride catalyst, CATALYST™ 531 (Omnova Solutions, Inc.) at about 2.5% on the weight of the bath, and a nonionic surfactant, PAT-WET™ LF-55 (Yorkshire Pat-Chem Inc., Greenville, S.C.), at about 0.1% on the weight of the bath. The fabric was dried and cured for 10 minutes at 150° C. Various performance tests were run on the fabric.

TABLE 1

| Designation | Material | Availability/Preparation |
|---|---|---|
| APTES | 3-aminopropyltriethoxysilane; NH$_2$(CH$_2$)$_3$Si(OC$_2$H$_5$)$_3$ | Sigma-Aldrich, Milwaukee, WI |
| APTMS | 3-aminopropyltrimethoxysilane; NH$_2$(CH$_2$)$_3$Si(OCH$_3$)$_3$ | Sigma-Aldrich |
| BO | 2-Butanone oxime; CH$_3$CH$_2$C(=NOH)CH$_3$ | Sigma-Aldrich |
| Ethyl acetate | CH$_3$CO$_2$C$_2$H$_5$ | Sigma-Aldrich |
| DBTDL | Dibutyltin dilaurate; [CH$_3$(CH$_2$)$_3$]$_2$Sn[CO$_2$(CH$_2$)$_{10}$CH$_3$]$_2$ | Sigma-Aldrich |
| MeFBSE | N-methylperfluorobutanesulfonyl ethanol; C$_4$F$_9$SO$_2$N(CH$_3$)CH$_2$CH$_2$OH | Made by reacting perfluorobutanesulfonyl fluoride with CH$_3$NH$_2$ and ethylene chlorohydrin, essentially as described in Ex. 1 of U.S. Pat. No. 2,803,656 (Ahlbrecht, et al.) |
| MIBK | Methylisobutyl ketone; (CH$_3$)$_2$CHCH$_2$C(O)CH$_3$ | Sigma-Aldrich |
| MPEG 350 | CARBOWAX ™ 350; Methoxypolyethylene glycol (MW$_{av}$ = 350) | Union Carbide, Danbury, CT |
| MPEG 550 | CARBOWAX ™ 550; Methoxypolyethylene glycol (MW$_{av}$ = 550) | Union Carbide, Danbury, CT |
| MPEG 750 | CARBOWAX ™ 750; Methoxypolyethylene glycol (MW$_{av}$ = 750) | Union Carbide, Danbury, CT |
| MPEG 2000 | CARBOWAX ™ 2000; Methoxypolyethylene glycol (MW$_{av}$ = 2000) | Union Carbide, Danbury, CT |
| N100 | DESMODUR ™ N-100; eq wt = 191 Polyfunctional isocyanate resin based on hexamethylene diisocyante | Bayer |
| N3300 | DESMODUR ™ N-3300; eq wt = 194 Polyfunctional isocyanate resin based on hexamethylene diisocyanate | Bayer, Pittsburgh, PA |
| PEG 1000 | CARBOWAX ™ 1000; Polyethylene glycol (MW$_{av}$ = 1000) | Union Carbide |
| PEG 1450 | CARBOWAX ™ 1450; Polyethylene glycol (MW$_{av}$ = 1450) | Union Carbide |
| PEG 3350 | CARBOWAX ™ 3350; Polyethylene glycol (MW$_{av}$ = 3350) | Union Carbide |
| FC-672 | Acrylate Stain Blocker | Minnesota Mining and Manufacturing, St Paul, MN |

Fabrics
Fabrics tested included: 65/35 polyester/cotton woven twill (8 ounces/yd$^2$ basis wt; available from Avondale Mills, Graniteville, S.C.), 50/50 polyester/cotton plain weave (6 ounces/yd$^2$ basis wt; available from Reeves Brothers Inc., Spartanburg, S.C.), and 60/40 cotton/polyester pique knit (5

Application of Compositions to Cotton/Polyester Knit Fabric

Knit fabrics were treated in the same way as the woven fabrics, with the exception that FREEREZ™ 845 (Noveon, Inc., Cleveland, Ohio), a pre-catalyzed glyoxal-type resin was used in place of the resin and catalyst combination above at about 12% on the weight of the bath.

Performance Test—Oil Repellency

This test measures the resistance of the treated fabric to oil-based insults. A drop of one standard surface tension fluid (of a series of 8, with decreasing surface tensions) is dropped on a treated fabric. If after thirty seconds there is no wetting, the next highest standard number fluid (next lowest surface tension) is tested. When the lowest number fluid soaks into the fabric, the next lower number is the rating. For example, the fabric will receive a three rating, if the number four fluid wets the fabric. A more detailed description of the test is written in the 3M Protective Material Division's "*Oil Repellency Test I*" method (Document # 98-0212-0719-0).

Performance Test—Water Repellency:

This test measures the resistance of the treated fibrous substrates to water based challenges. A drop of one standard surface tension fluid (of a series of 11, with decreasing surface tensions, based on water and water/isopropyl alcohol mixtures where 100% water is a 0 rating and 100% IPA is a 10 rating) is placed on a treated fabric to form a bead. If after thirty seconds there is no wetting, the next highest standard number fluid (next lowest surface tension) is tested. When the lowest number fluid soaks into the fabric, the next lower number is the rating. For example, the fabric will receive a three rating, if the number four fluid wets the fabric. A more detailed description of the test is written in the 3M Protective Material Division's "*Water Repellency Test II*" method (Document # 98-0212-0721-6).

Performance Test—Artificial Antisoiling

This test measures the resistance of the treated fibrous substrates to water based challenges. Typically a 12 in by 18 in sample of carpet is divided into three to six sections. One section is left untreated as the control and the other are treated with a protective finish and let dry at room temperature where T is = or <100 degrees F. and releative humidity is <50%. The treated article is afixed in a drum filled with 40 ceramic pellets half weighing 10 g and half weighing 20 g and 20 g of 3M standard oily test soil (available from 3M Protective Materials Division Product 41-4201-6292-1). The drum is rolled for 10 minutes and then rolled the other opposite direction for 10 minutes. The carpet is removed and vacuumed in two directions and the treated areas are compared with an untreated area. Direct comparisons are made within the same sample and are rated from 1 to 5 where 3 is untreated, 1 is more soiled and 5 is no significant soiling. A more detailed description of the test is written in the AATC "Artificial Antisoiling Test" method 123–1995.

Performance Test—Acid Stain Resistance

This test measures the resistance of the treated fibrous substrates to red acid dye stain. Test Method AATCC TM 175-1998 was followed.

Performance Test—Oil Repellency—Durability

The Oil Repellency Test was run on treated fabric that had subsequently been washed for 5, 10, or 20, consecutive launderings, followed by tumble drying, as described in the 3M Protective Materials Division "Laboratory Laundering Procedures" for home laundering simulation (Document # 98-0212-0703-4).

Performance Test—Stain Release

This test evaluates the release of forced-in oil-based stains from the treated fabric surface during simulated home laundering. Five drops of mineral oil, Stain K (Kaydol, Witco Chemical Co.) are dropped onto the fabric surface in a single puddle, and a separate puddle of 5 drops of MAZOLA™ corn oil, Stain E, are dropped on the fabric, and in a third puddle, 5 drops of dirty motor oil (3M Co.) are dropped onto the fabric. The puddles are covered with glassine paper, and weighted with a five-pound weight each for 60 seconds. The weights and glassine paper are removed from the fabric. The fabric sample is hung for 15–60 minutes, and then washed and dried. Samples are evaluated against a rating board, and assigned a number from 1 to 8. An 8 represents total removal of the stain, where 1 is a very dark stain. A more detailed description of the test is written in the 3M Protective Material Division's "Stain Release Test I" method (Document # 98-0212-0725-7).

Performance Test—Stain Release—Durability

The Stain Release Test was run on treated fabric that had subsequently been washed for, e.g., 5, 10, or 20, consecutive launderings, followed by tumble drying, as described in the 3M Protective Material Division's "Laboratory Laundering Procedures" for home laundering simulation (Document # 98-0212-0703-4).

Performance Test—Fabric Absorbency

This test provides a rough index of fabric absorbency. A drop of water is placed on the fabric surface, and the amount of time it takes for that drop to absorb into the fabric, leaving a matte, wet surface, is recorded. A more detailed description of the test is written in the 3M Protective Material Division's "Fabric Absorbency Test" method (Document # 98-0212-0710-9). Absorbency time is also referred to as the wicking time. Wetting time is the time from application of the water drop, until the first evidence of darkening or wetting appears under the water drop, was also recorded.

Preparation 1

Fluorochemical urethane MeFBSE/N3300/PEG 1450/APTES A 1 liter flask was charged with of MeFBSE (58.89 g), DBTDL (3 drops; ~20 mg) and MIBK(237.0 g). The temperature of the stirred mixture was raised to 60° C. under a purge of dry nitrogen. N3300 (40.0 g) was then slowly added, maintaining the temperature between 60–65 C. Upon completion of the addition, the reaction mixture was stirred for 1 hour at 60° C. APTES (4.56 g) was then added dropwise, keeping temperature of the reaction mixture below 65° C., and the reaction mixture was stirred for 30 minutes. Solid PEG 1450 (14.95 g) was added to the stirred mixture, and the reaction was followed to completion via FTIR, as determined by disappearance of the —NCO band at approximately 2289 wavenumbers.

Emulsification: To this vigorously stirred organic mixture was slowly added DI water ( 944 g; @ 60° C.). This pre-emulsion mixture was then sonicated for 2 minutes. A rotary evaporator connected to an aspirator was used to strip the MIBK from the mixture. The resulting emulsion was 20–30% solids.

The method described in Preparation 1 was followed to produce Preparations 2–11 and Comparative Preparation C1, using equivalent weight ratios and substitutions of materials as listed in Table 2.

TABLE 2

| Preparation No. | Eq. Wt. isocyanate (type) | Eq. Wt. of MeFBSE | Eq. Wt. of aminosilane (type) | Eq. Wt. of glycol (type) |
|---|---|---|---|---|
| 1 | 1.00 (N3300) | 0.80 | 0.10 (APTES) | 0.10 (PEG 1450) |
| 1a | 1.00 (N3300) | 0.80 | 0.10 (APTMS) | 0.10 (PEG 1450) |
| 2 | 1.00 (N3300) | 0.80 | 0.05 (APTES) | 0.15 (PEG 1450) |
| 3 | 1.00 (N3300) | 0.70 | 0.15 (APTES) | 0.15 (PEG 1450) |
| 4 | 1.00 (N100) | 0.80 | 0.05 (APTES) | 0.15 (PEG 1450) |
| 5 | 1.00 (N100) | 0.80 | 0.10 (APTES) | 0.10 (PEG 1450) |
| 6 | 1.00 (N3300) | 0.80 | 0.075 (APTMS) | 0.125 (PEG 1450) |
| 2a | 1.00 (N3300) | 0.80 | 0.05 (APTMS) | 0.15 (PEG 1450) |
| C1 | 1.00 (N3300) | 0.80 | — | 0.20 (PEG 1450) |
| 7 | 1.00 (N3300) | 0.80 | 0.05 (APTES) | 0.15 (MPEG 350) |
| 8 | 1.00 (N3300) | 0.80 | 0.05 (APTMS) | 0.15 (MPEG 550) |
| 9 | 1.00 (N3300) | 0.80 | 0.05 (APTMS) | 0.15 (PEG 1000) |
| 10 | 1.00 (N3300) | 0.80 | 0.05 (APTMS) | 0.15 (MPEG 2000) |
| 11 | 1.00 (N3300) | 0.80 | 0.05 (APTMS) | 0.15 (PEG 3350) |

Testing on Carpet preparations 1–11 and Comparative Preparation C1 were diluted to a 3% solids emulsion with DI water and applied to carpet as an aerosolized spray (Blue Transition III virgin carpet available from Shaw Industries, Dalton, Ga.) to net a 0.6 g/ft$^2$ solids add-on. Results of static water repellency (Performance Test—Water Repellency), static oil repellency (Performance Test—Oil Repellency), antisoiling (Performance Test—Anti-Soiling Resistance) and acid stain resistance testing (Performance Test—Acid Stain Resistance) for Examples C1–C11 are listed in Table 3.

TABLE 3

| Ex | Preparation No. | Static Water Repellency | Static Oil Repellency | Anti-soiling | Acid Stain Resistance |
|---|---|---|---|---|---|
| C1 | C1 | 4 | 4 | 3.5 | 3.5 |
| C2 | 1 | 4 | 5 | 4.5 | 3.5 |
| C3 | 2 | 4 | 4 | 4 | 3.5 |
| C4 | 3 | 3 | 3 | 3.5 | 3.5 |
| C5 | 4 | 2 | 2 | 4 | 3 |
| C6 | 5 | 2 | 2 | 4 | 3 |
| C7 | 6 | 4 | 4 | 4.5 | 3.5 |
| C8 | 7 | 3 | 3 | 4.5 | 3.5 |
| C9 | 8 | 2 | 3 | 4.5 | 3.5 |
| C10 | 9 | 3 | 3 | 4.5 | 3.5 |
| C11 | 10 | 1 | 2 | 3.5 | 3.5 |
| C12 | 11 | DI Water | 2 | 3 | 3.5 |
| C14 | C3 (untreated) | None | None | 3 | 1 |

Test on fabrics:

Preparations 1–11 and Comparative Preparation C1, were diluted to 4% solids emulsion with DI water and applied to cotton/polyester 35/65 blend fabric (#7206 from Test Fabrics Inc. Middlesex, N.J.) to yield a 0.8 g/ft$^2$ add-on.

TABLE 4

| Ex | Preparation No. | Static Water Repellency | Static Oil Repellency | Antisoiling |
|---|---|---|---|---|
| C15 | C1 | 3 | 4 | 3.5 |
| C16 | 1 | 3 | 4 | 4.5 |
| C17 | 2 | 3 | 4 | 4 |
| C18 | 3 | 1 | 4 | 3.5 |
| C19 | 4 | 1 | 2 | 4 |
| C20 | 5 | 1 | 2 | 4 |
| C21 | 6 | 3 | 5 | 4.5 |
| C23 | untreated | 0 | 0 | 1 |

Preparation 12

Blocked isocyanate extender N100/MPEG 750/BO

A 1 liter flask, equipped with a reflux condenser, a mechanical stirrer, thermocouple and nitrogen inlet was charged with N100 (95.5 g), ethyl acetate (250.0 g) and MPEG 750 (125.0 g). To this stirred mixture was added DBTDL (0.25 g) and the ensuing mixture was heated to 75° C. and stirred overnight. The mixture was then cooled to room temperature and BO (29.1 g) was added dropwise with stirring. The mixture was heated to 75° C. and stirred overnight. DI water (750.0 g) was slowly added, allowing the temperature to be held between 65° C. and 75° C. during addition. The mixture was homogenized using an ultrasonic homogenizer (model CPX 600, available from Cole-Parmer, Vernon Hills, Ill.) for five minutes. Ethyl acetate was removed by distillation under reduced pressure. A hazy solution was obtained.

Preparations 13–15

The procedure outlined above for Preparation 12 was followed to make Preparation 13–15, with substitution of materials as described in Table 5.

TABLE 5

| Preparation | % solids | MPEG | —NCO equiv | —OH equiv | BO equiv | Water equiv |
|---|---|---|---|---|---|---|
| 13 | 31.1 | 550 | 1.00 | 0.33 | 0.67 | 0.00 |
| 14 | 30.5 | 750 | 1.00 | 0.33 | 0.38 | 0.29 |
| 15 | 31.7 | 2000 | 1.00 | 0.33 | 0.67 | 0.00 |

Table 5. Results of Preparations C1, 2 and 7 applied to 50/50 polyester/cotton plain weave fabric

TABLE 6

| Ex | Preparation | Solids on fiber | Initial Oil repellency | Wet | Absorbency | K | E | C |
|---|---|---|---|---|---|---|---|---|
| C24 | — | — | 0 | 0.5 | 30 | 5 | 5 | 3 |
| C25 | 2 | 0.20 | 6 | 23 | 30 | 6.5 | 6 | 5.5 |
| C26 | C1 | 0.19 | 6 | 15 | 30 | 7 | 6.5 | 6 |
| C27 | 2a | 0.22 | 6 | 24.3 | 30 | 6.5 | 7 | 6.5 |

Table 6. Results of Preparations C1, 2 and 8 applied to 50/50 polyester cotton weave fabric; extended launderings (5, 10 and 20).

TABLE 7

| Ex | O/R | Wet | Absorbency | K | E | C |
|---|---|---|---|---|---|---|
| 5 Launderings | | | | | | |
| C24 | 0 | 0.5 | 6.3 | 5 | 5 | 3 |
| C25 | 3 | 13 | 30 | 6.5 | 6.5 | 5 |
| C26 | 0 | 0.5 | 30 | 6.5 | 7 | 5 |
| C27 | 3 | 18 | 30 | 6.5 | 6.5 | 6.5 |
| 10 Launderings | | | | | | |
| C24 | 0 | 0.5 | 6.7 | 5 | 5 | 3 |
| C25 | 1.5 | 2.3 | 30 | 6 | 7 | 6 |
| C26 | 0 | 0.5 | 30 | 6 | 6.5 | 5 |
| C27 | 1.5 | 1.3 | 30 | 6.5 | 7 | 5 |
| 20 Launderings | | | | | | |
| C24 | 0 | 0.5 | 5.1 | 5 | 5 | 3 |
| C25 | 0.5 | 1.3 | 30 | 6.5 | 6 | 4 |
| C26 | 0 | 0.5 | 23 | 6 | 6 | 5 |
| C27 | 1 | 0.5 | 30 | 6.5 | 6 | 4 |

Tables 6 and 7, example C-26, shows that without the silane, no oil repellency is present at 5 launderings, where examples C-25 and C-27, with silane, show oil repellency durability to 20 launderings. Samples C-25 and C-27 show longer absorbency times than C-26. Longer absorbency times are a measure of the resistance of the fabric to wet-out by aqueous materials, e.g. water. In all examples, stain release values were at least one point, or significantly better than, the control example, C-24.

Table 8 Results of Preparation 7 (0.45% solids on fiber) with various extenders on 60/40 cotton/polyester pique knit fabric

TABLE 8

| Ex | Prep | C4 sof | Extender sof | O/R | Wet | Initial Absorbency | K | E | C |
|---|---|---|---|---|---|---|---|---|---|
| C-28 | — | — | — | 0 | 0.5 | 0.5 | 5 | 6.5 | 3 |
| C-29 | 2 | 0.453 | 4 | | 1.7 | 30 | 7 | 7.5 | 6.5 |
| 1 | 2a & 13 | 0.453 | 0.53 | 4.5 | 2.7 | 30 | 7 | 7.5 | 7.5 |
| 2a | 2a & 14 | 0.453 | 0.52 | 4.5 | 6.7 | 30 | 7.5 | 8 | 7.5 |
| 3 | 2a & 15 | 0.453 | 0.54 | 5 | 2.8 | 30 | 7.5 | 8 | 7.5 |

Table 9. Results of Preparation 2 applied to 60/40 cotton/polyester knit fabric; extended launderings (4, 8 and 12)

TABLE 9

| Ex | O/R | Wet | Absorbency | K | E | C |
|---|---|---|---|---|---|---|
| 4 Launderings | | | | | | |
| C-28 | 0 | 0.5 | 0.5 | 5 | 6.5 | 3 |
| C-29 | 0 | 1.1 | 30 | 6.5 | 7 | 6.5 |
| 1 | 0 | 2.2 | 30 | 7 | 7 | 7 |
| 2 | 0 | 1.2 | 27.1 | 7.5 | 7.5 | 7 |
| 3 | 0 | 1.3 | 30 | 7.5 | 7 | 7 |
| 8 Launderings | | | | | | |
| C-28 | | 0.5 | 0.5 | 5 | 6 | 3 |
| C-29 | | 0.5 | 30 | 6.5 | 7 | 6.5 |
| 1 | | 1 | 30 | 6.5 | 7 | 6.5 |
| 2 | | 1.2 | 27.8 | 7 | 7.5 | 7 |
| 3 | | 0.5 | 5.8 | 6.5 | 7.5 | 6.5 |
| 12 Launderings | | | | | | |
| C-28 | | 0.5 | 0.5 | 5 | 6.5 | 3 |
| C-29 | | 0.5 | 30 | 6.5 | 6.5 | 5 |
| 1 | | 0.5 | 30 | 6.5 | 6.5 | 6.5 |
| 2 | | 0.5 | 30 | 7 | 7 | 6.5 |
| 3 | | 0.5 | 5 | 7 | 7 | 6 |

Tables 8 & 9 show performance on a knitted substrate of the fluorinated compound alone, C-29, and the performance of the fluorinated compound with the various extender preparations, 1, 2, 3. In examples 1 and 2, extenders with MPEG 550 and 750 respectively, extended both the absorbency times, and the release of Stain C, to at least 12 launderings. In example 3, use of an extender with MPEG 2000, improved the release of Stain C. Overall, stain release is shown to be improved by treatment with the fluorinated and hydrocarbon extender in combination.

Table 10 Results of Preparation 1 applied at 0.29% solids on fiber to 65/35 Polyester/Cotton twill fabric with various extenders.

TABLE 10

| Ex | Preparation | C4 sof | Extender sof |
|---|---|---|---|
| C-30 | — | — | — |
| C-31 | 1 | 0.289 | — |
| 4 | 1a & 13 | 0.289 | 0.44 |
| 5 | 1a & 14 | 0.289 | 0.43 |
| 6 | 1a & 15 | 0.289 | 0.45 |

Table 11 Results of Preparation 1 applied at 3% to 65/35 Polyester/cotton twill fabric initial, 5 and 10 launderings

TABLE 11

| Ex | O/R | Wet | Absorbency | K | E | C |
|---|---|---|---|---|---|---|
| Initial | | | | | | |
| C-30 | 0 | 0.5 | 3.1 | 6 | 6 | 4 |
| C-31 | 6 | 30 | 30 | 7 | 7 | 4 |
| 4 | 6 | 30 | 30 | 7.5 | 7.5 | 7 |
| 5 | 6 | 30 | 30 | 7.5 | 7 | 7 |
| 6 | 6 | 30 | 30 | 7.5 | 7.5 | 7 |
| 5 Launderings | | | | | | |
| C-30 | 0 | 0.5 | 0.5 | 6 | 6.5 | 4 |
| C-31 | 5 | 30 | 30 | 7 | 6.5 | 3 |
| 4 | 5 | 30 | 30 | 7.5 | 7 | 6.5 |
| 5 | 4 | 30 | 30 | 7.5 | 7 | 6.5 |
| 6 | 2 | 10.8 | 30 | 7.5 | 7 | 7 |
| 10 Launderings | | | | | | |
| C-30 | 0 | 0.5 | 0.5 | 6 | 6.5 | 4 |
| C-31 | 4 | 30 | 30 | 7 | 6.5 | 3 |
| 4 | 3.5 | 30 | 30 | 7 | 7 | 5 |
| 5 | 2 | 30 | 30 | 7.5 | 7 | 6 |
| 6 | 1.5 | 1.9 | 30 | 7.5 | 7 | 6.5 |

Table 12. Results of Preparation 1 applied at 3% to 65/35 Polyester/cotton twill fabric 20, 25 and 30 launderings

TABLE 12

| | O/R | Wet | Absorbency | K | E | C |
|---|---|---|---|---|---|---|
| 20 Launderings | | | | | | |
| C-30 | 0 | 0.5 | 0.5 | 6 | 6 | 4 |
| C-31 | 2 | 11.1 | 30 | 7 | 7 | 3 |
| 4 | 2 | 2.3 | 30 | 6.5 | 7 | 6.5 |

TABLE 12-continued

|  | O/R | Wet | Absorbency | K | E | C |
|---|---|---|---|---|---|---|
| 5 | 1 | 9.2 | 30 | 7 | 7 | 6 |
| 6 | 0 | 0.5 | 11.7 | 7.5 | 7 | 7 |
| | | | 25 Launderings | | | |
| C-30 | 0 | 0.5 | 0.5 | 6 | 6.5 | 4 |
| C-31 | 2 | 4.5 | 30 | 7 | 6.5 | 2.5 |
| 4 | 1.5 | 4.2 | 30 | 7 | 7 | 6 |
| 5 | 0.5 | 1.6 | 30 | 7 | 6.5 | 6 |
| 6 | 0 | 0.5 | 10.6 | 7.5 | 7.5 | 7 |
| | | | 30 Launderings | | | |
| C-30 | 0 | 0.5 | 0.5 | 6 | 6.5 | 4 |
| C-31 | 1.5 | 4.1 | 30 | 7 | 6.5 | 2.5 |
| 4 | 1 | 2.5 | 30 | 7 | 6.5 | 6 |
| 5 | 0.5 | 1.6 | 30 | 7 | 6.5 | 6 |
| 6 | 0 | 0.5 | 2.8 | 7.5 | 7.5 | 7 |

Tables 10, 11, and 12 demonstrate performance of the various preparations on yet another fabric, 65/35 polyester/cotton twill. Anti-absorbency benefits of extender preparations 13 and 14 are again demonstrated in examples 4 and 5. All extender examples, 4, 5 and 6 show significant improvements in release of Stain C in as many as 30 home launderings. Again, on average, stain release is improved with the combination of the hydrocarbon extender and fluorochemical compound.

Table 13 shows that curing compositions at ambient conditions (7) will provide stain release benefits to fabrics over controls (C-32, C-33).

TABLE 13

| | Prepara- | | | Cure | Initial | | |
| Ex | tion | C4 sof | Extender sof | Temp | O/R | K | E | C |
|---|---|---|---|---|---|---|---|---|
| C-32 | — | — | — | RT | 0 | 6 | 6 | 4 |
| C-33 | — | — | — | 300 F. | 0 | 6 | 6 | 4 |
| 7 | 6 & 15 | 0.56 | 0.16 | RT | 0 | 6.5 | 7 | 6 |
| 8 | 6 & 15 | 0.56 | 0.16 | 150 F. | 1 | 7 | 7 | 6 |
| 9 | 6 & 15 | 0.56 | 0.16 | 200 F. | 5 | 7 | 8 | 6.5 |
| 10 | 6 & 15 | 0.56 | 0.16 | 250 F. | 5 | 7.5 | 7.5 | 7 |
| 11 | 6 & 15 | 0.56 | 0.16 | 300 F. | 5 | 7 | 7.5 | 7.5 |

What is claimed is:

1. A chemical composition comprising:
   (a) a first component comprising one or more fluorochemical urethane compounds comprising the reaction product of:
   (1) one or more polyfunctional isocyanate compounds;
   (2) one or more hydrophilic polyoxyalkylene compounds;
   (3) one or more silane compounds of the formula:

$X-R^1-Si-(Y)_3$ wherein
   X is $-NH_2$; $-SH$; $-OH$; $-N=C=O$; or $-NRH$ where R is selected from the group consisting of phenyl, straight and branched aliphatic, alicyclic, and aliphatic ester groups; $R^1$ is an alkylene, heteroalkylene, aralkylene, or heteroaralkylene group; and each Y is independently a hydroxyl; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety; and
   (4) one or more fluorochemical monofunctional compound; and
   (b) a second component comprising one or more hydrophilic auxiliary compounds capable of further improving the oil- and/or water repellency or soil/stain release properties of a fibrous substrate treated with the fluorochemical urethane compounds;
   wherein said auxiliary compounds of said second component are selected from the group consisting of:
   i) the reaction product of a polyisocyanate a blocking agent and a polyoxyalkylene compound,
   ii) hydrophilic carbodiimides, and
   iii) hydrophilic polymers of acrylic and/or methacrylic acid.

2. The chemical composition of claim 1 wherein the polyfunctional isocyanate compound of said first component is a diisocyanate or triisocyanate.

3. The chemical composition of claim 1 wherein the fluorochemical monofunctional compound of said first component is of the formula:

$R_f-Z-R^2-X$ wherein:
$R_f$ is a perfluoroalkyl group or a perfluoroheteroalkyl group;
Z is a connecting group selected from a covalent bond, a sulfonamido group, a carboxamido group, a carboxyl group, or a sulfonyl group; and
$R^2$ is a divalent straight or branched chain alkylene, cycloalkylene, or heteroalkylene group of 1 to 14 carbon atoms; and
X is $-NH_2$; $-SH$; $-OH$; $-N=C=O$; or $-NRH$ where R is selected from the group consisting of phenyl, straight and branched aliphatic, alicyclic, and aliphatic ester groups; $R^1$ is an alkylene, heteroalkylene, aralkylene, or heteroaralkylene group.

4. The chemical composition of claim 3 wherein $R_f$ is a perfluoroalkyl group of 2 to 12 carbons.

5. The chemical composition of claim 3 wherein $R_f$ is a perfluoroalkyl group of 3 to 5 carbons.

6. The composition of claim 1 wherein said first component polyoxyalkylene compounds are homopolymers of polyoxyethylene and copolymers of polyoxyethylene and polyoxypropylene.

7. The composition of claim 1 wherein the isocyanate groups of said auxiliary compounds are blocked isocyanate groups.

8. The composition of claim 7 wherein said blocked isocyanate groups are prepared by a thermally reversible reaction with phenols, lactams, or oximes.

9. The composition of claim 1 wherein said polyoxyalkylene compounds of said second component are homopolymers of polyoxyethylene and copolymers of polyoxyethylene and polyoxypropylene or polyoxytetramethylene.

10. The composition of claim 1 wherein said polyoxyalkylene compound of said second component has a functionality of one.

11. The composition of claim 1 wherein the amount of said hydrophilic polyoxyalkylene compounds of said first component is sufficient to react with between 0.1 and 30% or isocyanate groups, the amount of said silane compounds is sufficient to react with between 0.1 and 25% of isocyanate groups, and the amount of said fluorochemical monofunctional compounds is sufficient to react with between 60 and 90% of isocyanate groups, wherein said isocyanate group are of said first component polyfunctional isocyanate compounds.

12. The composition of claim 1 wherein the amount of said polyoxyalkylene compound of said second component is such that from about 25 to about 75% of the isocyannic groups of said auxiliary compound are reacted.

13. The composition of claim 12 wherein the unreacted isocyanate groups are blocked isocyanate group.

14. The composition of claim 1 wherein said polyoxyalkylene compound of said first component has a functionality of greater than 1.

15. A treatment composition comprising a solution of the chemical composition of claim 1 and a solvent.

16. The treatment composition of claim 15 wherein the solvent is selected from the group consisting of water, an organic solvent, and mixtures thereof.

17. The treatment composition of claim 15 comprising from about 0.1 to about 50 weight percent chemical composition.

18. An article comprising a substrate having a cured coating derived from at least one solvent and a chemical composition of claim 1.

19. The article of claim 18 wherein said substrate is a fibrous substrate.

20. A method for imparting stain-release characteristics to a substrate comprising the steps of applying the treatment composition of claim 1, and allowing the coating composition to cure.

21. The method of claim 20 wherein said substrate is a fibrous substrate.

22. The method of claim 21 wherein said coating composition is applied in an amount sufficient to provide between 0.05% and 5% by weight buds on fiber.

23. The method of claim 21 wherein said composition is cured at ambient temperature.

24. A method for imparting stain-release characteristics to a fibrous substrate comprising the steps of:

(a) applying a treatment composition of claim 15, and, (b) curing the coating composition at elevated temperature to deblock said blocked isocyanate groups.

* * * * *

UNITED STATES PATENT AND TRADEMARK OFFICE
CERTIFICATE OF CORRECTION

PATENT NO. : 6,890,360 B2  Page 1 of 1
APPLICATION NO. : 10/022118
DATED : May 10, 2005
INVENTOR(S) : Linda G. Cote et al.

It is certified that error appears in the above-identified patent and that said Letters Patent is hereby corrected as shown below:

Col. 21
Line 22, delete "preparations" and insert -- Preparations --, therefor.

Col. 23
In Col. 4, in Row 2, in (Table 8), above "0.53" delete "4".
In Col. 5, in Row 2, in (Table 8), below "0" insert -- 4 --.

Col. 24
Line 13, delete "extended" and insert -- extend --, therefor.

Col. 26
Line 64, in Claim 11, delete "or" and insert -- of --, therefor.

Col. 27
Line 6, in Claim 12, delete "isocyannic" and insert -- isocyanate --, therefor.

Col. 28
Line 13, in Claim 22, delete "buds" and insert -- solids --, therefor.

Signed and Sealed this

Twentieth Day of November, 2007

JON W. DUDAS
*Director of the United States Patent and Trademark Office*